US008422898B2

(12) United States Patent

Nakatsuji et al.

(10) Patent No.: US 8,422,898 B2

(45) Date of Patent: Apr. 16, 2013

(54) IMAGE FORMING APPARATUS

(75) Inventors: Hiroomi Nakatsuji, Osaka (JP); Jun Nakano, Osaka (JP); Hiroki Tanaka, Osaka (JP)

(73) Assignee: Kyocera Document Solutions Inc. (JP)

( * ) Notice: Subject to any disclaimer, the term of this patent is extended or adjusted under 35 U.S.C. 154(b) by 396 days.

(21) Appl. No.: 12/956,818

(22) Filed: Nov. 30, 2010

(65) Prior Publication Data

US 2011/0182601 A1 Jul. 28, 2011

(30) Foreign Application Priority Data

Jan. 27, 2010 (JP) ................................ 2010-016039
Jul. 29, 2010 (JP) ................................ 2010-171167

(51) Int. Cl.

*G06K 15/00* (2006.01)
*G06K 5/00* (2006.01)
*H04N 1/407* (2006.01)

(52) U.S. Cl.

USPC ................ 399/49; 399/46; 399/72; 358/3.06; 358/521; 347/116; 347/240; 347/251; 347/254

(58) Field of Classification Search .................... 399/11, 399/31, 36, 46, 49, 60, 72; 347/116, 131, 347/133, 240, 251–254; 358/3.06, 521

See application file for complete search history.

(56) References Cited

U.S. PATENT DOCUMENTS

| | | | | |
|---|---|---|---|---|
| 6,603,566 | B1 | 8/2003 | Shono | |
| 2004/0227966 | A1 * | 11/2004 | Lee | 358/1.9 |
| 2007/0046961 | A1 * | 3/2007 | Kashibuchi et al. | 358/1.9 |
| 2007/0058199 | A1 * | 3/2007 | Kawano et al. | 358/3.01 |
| 2010/0092191 | A1 * | 4/2010 | Sheflin et al. | 399/49 |

FOREIGN PATENT DOCUMENTS

JP 2000-101836 4/2000

* cited by examiner

*Primary Examiner* — Walter L Lindsay, Jr.
*Assistant Examiner* — Jessica L Eley
(74) *Attorney, Agent, or Firm* — Stephen Chin

(57) ABSTRACT

In the image forming apparatus, the partial image data for gradation adjustment is threshold conversion data of a partial image, the partial image is a part of a base pattern image with a predetermined size and does not contain any sides of the base pattern image, and the base pattern image is an image generated in an error diffusion method; and the patch image generator unit generates an image of a toner pattern by arranging the partial image of the partial image data repeatedly, and forms the toner pattern.

20 Claims, 6 Drawing Sheets

IMAGE FORMING APPARATUS

CROSS-REFERENCE TO RELATED APPLICATIONS

This application relates to and claims priority rights from Japanese Patent Applications: No. 2010-016039, filed on Jan. 27, 2010, and No. 2010-171167, filed on Jul. 29, 2010, the entire disclosures of which are hereby incorporated by reference herein.

BACKGROUND OF THE INVENTION

1. Field of the Invention

This invention relates to an image forming apparatus.

2. Description of the Related Art

In an image forming apparatus that forms an image by electronic photography process, such as printer, copier, facsimile, and multi-function peripheral thereof, a toner image is developed on a photoconductor drum, and the toner image is transferred onto the intermediate transfer belt, and then transferred from the intermediate transfer belt to a sheet of print paper, and finally the toner image is fixed on the sheet of print paper.

In such image forming apparatus, when necessary or periodically, toner density and its gradation are adjusted. In four-color image forming apparatus, toner density and its gradation are adjusted for each of four colors.

To print a scanned document, some image forming apparatuses chooses a threshold conversion process (e.g. an error diffusion process or a screen process) according to the type of the document, and generate image data by using the chosen process. Otherwise, for a single page, a plural of threshold conversion processes may be used. Therefore, gradation adjustment must be performed for the error diffusion process and the screen process separately.

In the case that the apparatus performs automatic gradation adjustment of the error diffusion process, for instance, the apparatus has a ROM (Read Only Memory) that stores data of a pattern image generated by a single-threshold conversion from patch images with density values in the gradation, and forms a toner pattern image based on the data, detects the pattern image by a sensor, and then performs gradation adjustment.

Alternatively, the apparatus performs the error diffusion process for each of pixels sequentially to generate data of a pattern image of single-threshold conversion, and stores the generated data in a RAM (Random Access Memory); and then forms a toner pattern image based on the data, detects the pattern image by a sensor, and then performs gradation adjustment.

In case of using a threshold conversion method such as error diffusion process that performs threshold conversion (e.g. single threshold conversion) by sequentially calculating a converted pixel value from original values of adjacent pixels, since a pattern image for adjustment generated by such method is irregular (i.e. has a long cycle), large capacity is required to a ROM or a RAM that stores the pattern image. Therefore, a cost of the apparatus tends to be high.

It should be noted that a gradation characteristic of one of an error diffusion process and a screen process can be adjusted according to the other of them. However, there are large difference between the error diffusion process and the screen process in half-toning calculation, and the gradation characteristics of them do not vary in the same manner due to its usage environment and its usage situation, and consequently, such adjustment may not be accurate.

SUMMARY OF THE INVENTION

This invention has been made in view of the aforementioned circumstances. It is an object of the present invention to provide an image forming apparatus in which even if a half-toning method that generates an irregular pattern image (i.e. long cycle pattern image) is used, data of such pattern image (that is, patch images generated by threshold conversion) for gradation adjustment can be stored in a small memory area.

The present invention solves these subjects as follows.

An image forming apparatus of the present invention comprises: an image carrier capable of holding a toner pattern; a memory device in which toner pattern data is stored; a sensor that puts detection light onto the image carrier and detects reflection light from the image carrier; and a control unit that forms the toner pattern based on the toner pattern data and identifies a toner density of the toner pattern from output of the sensor. The toner pattern data is threshold conversion data of a partial image, the partial image is a part of a base pattern image with a predetermined size and does not contain any sides of the base pattern image, and the base pattern image is an image generated in a threshold conversion method that performs single or multiple threshold conversion by sequentially calculating a converted pixel value from original values of adjacent pixels. The control unit generates an image of the toner pattern by arranging the partial image of the toner pattern data repeatedly.

Therefore, even if a half-toning method that generates an irregular pattern image (i.e. long cycle pattern image) is used, data of such pattern image (that is, patch images generated by threshold conversion) for gradation adjustment can be stored in a small memory area. In addition, since the partial image does not contain any sides of the base pattern image, a density adjustment error due to using the partial image tends to be small.

These and other objects, features and advantages of the present invention will become more apparent upon reading of the following detailed description along with the accompanied drawings.

DETAILED DESCRIPTION OF THE PREFERRED EMBODIMENT

Hereinafter, embodiments according to aspects of the present invention will be explained with reference to drawings.

Embodiment 1

Figure 1:
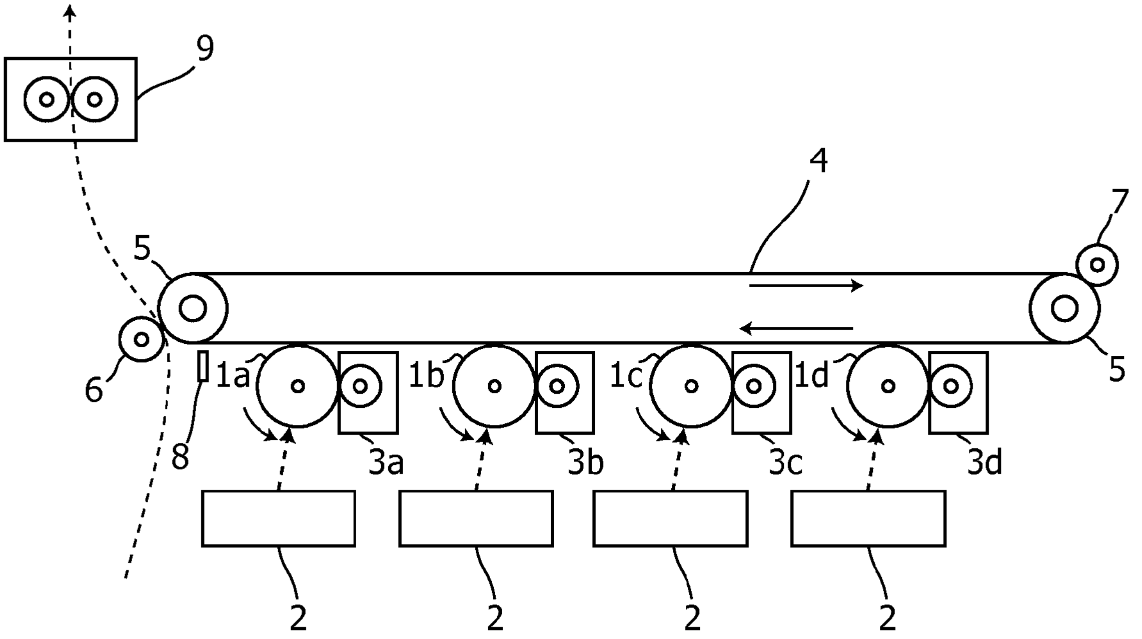
FIG. 1 is a side view that partially shows a mechanical internal configuration of an image forming apparatus in Embodiment 1 according to this invention.

FIG. 1 is a side view that partially shows a mechanical internal configuration of an image forming apparatus in Embodiment 1 according to this invention. The image forming apparatus is an apparatus having a printing function such as printer, facsimile apparatus, copier, or multi-function peripheral.

The image forming apparatus in Embodiment 1 has a tandem-type color developing device. This color developing device has photoconductor drums 1*a* to 1*d*, an exposure device 2, and development units 3*a* to 3*d*. The photoconductor drums 1*a* to 1*d* are four color photoconductors of Cyan, Magenta, Yellow and Black. The exposure device 2 is a device that forms an electrostatic latent image by irradiating laser light to the photoconductor drums 1*a* to 1*d*. The exposure device 2 has a laser diode as a light source of the laser light, and optical elements (such as lens, mirror and polygon mirror) that guide the laser light to the photoconductor drums 1*a* to 1*d*.

Further, in the periphery of the photoconductor drums 1*a* to 1*d*, a charging unit such as scorotron, a cleaning device, a static electricity eliminator and so on are disposed. The cleaning device removes residual toner on the photoconductor drums 1*a* to 1*d* after primary transfer. The static electricity eliminator eliminates static electricity of the photoconductor drums 1*a* to 1*d* after primary transfer.

The development units 3*a* to 3*d* are filled with four color toner of Cyan, Magenta, Yellow and Black, and make the toner adhere to an electrostatic latent image on the photoconductor drums 1*a* to 1*d*, so that a toner image is formed. The developing device is composed of the exposure device 2 and the development unit 3*a* to 3*d*. A developer is composed of the toner and a carrier with external additives such as titanium dioxide.

The photoconductor drum 1*a* and the development unit 3*a* perform development of Magenta. The photoconductor drum 1*b* and the development unit 3*b* perform development of Cyan. The photoconductor drum 1*c* and the development unit 3*c* perform development of Yellow. The photoconductor drum 1*d* and the development unit 3*d* perform development of Black.

The intermediate transfer belt 4 is an image carrier and loop-shaped intermediate transferer, and contacts the photoconductor drums 1*a* to 1*d*. Toner images on the photoconductor drums 1*a* to 1*d* are primarily transferred onto the intermediate transfer belt 4. The intermediate transfer belt 4 is hitched round driving rollers 5, and rotates by driving force of the driving rollers 5 towards the direction from the contact position with the photoconductor drum 1*a* to the contact position with the photoconductor drum 1*d*.

A transfer roller 6 makes a conveyed sheet of paper contact the intermediate transfer belt 4, and secondarily transfers the toner image on the intermediate transfer belt 4 to the sheet. The sheet on which the toner image has been transferred is conveyed to a fixer 9, and consequently, the toner image is fixed on the sheet.

A roller 7 has a cleaning brush, and removes residual toner on the intermediate transfer belt 4 by contacting the cleaning brush to the intermediate transfer belt 4 after transferring the toner image to the sheet.

A sensor 8 irradiates light (detection light) to the intermediate transfer belt 4 and detects its reflection light. Intensity of the reflection light varies according to toner density and/or glossiness of a surface of the intermediate transfer belt 4. During density adjustment and gradation adjustment, the sensor 8 irradiates light to a predetermined area on the intermediate transfer belt 4, detects its reflection light, and outputs an electrical signal corresponding to the detected intensity of the reflection light. This electrical signal is input to a print engine 11 directly or via an amplifier circuit, and is sampled.

Figure 2:
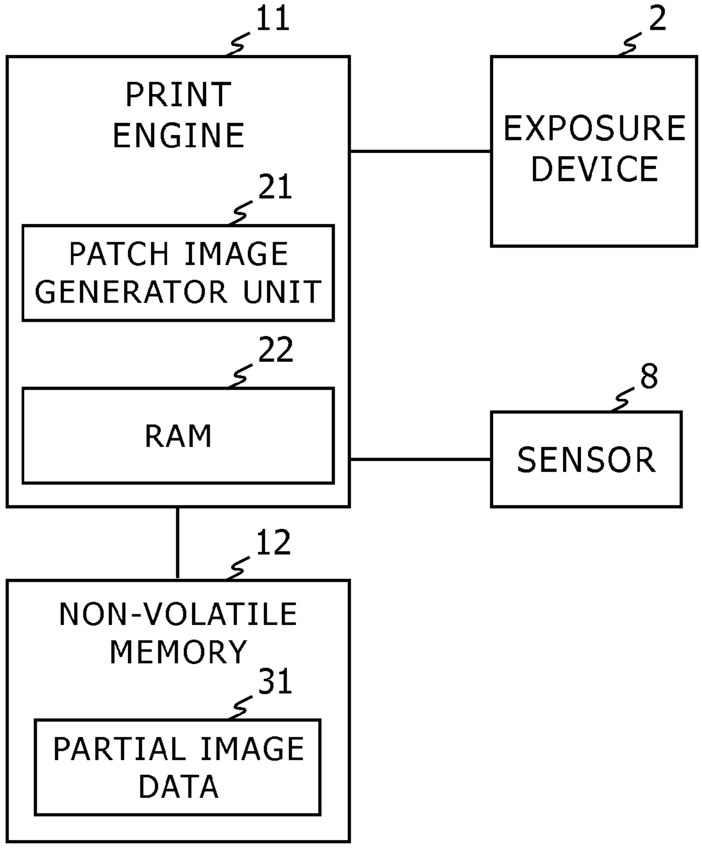
FIG. 2 is a block diagram that shows an electronic configuration of an image forming apparatus in Embodiment 1 according to this invention.

FIG. 2 is a block diagram that shows an electronic configuration of an image forming apparatus in Embodiment 1 according to this invention. In FIG. 2, the print engine 11 is a processing circuit that controls a driving source that drives the aforementioned rollers, a bias induction circuit that induces a development bias and a primary transfer bias, and the exposure device 2 in order to perform developing, transferring and fixing the toner image, feeding a sheet of paper, printing on the sheet, and outputting the sheet. The print engine 11 is an instance of the control unit. The development bias is induced between the photoconductor drums 1*a* to 1*d* and the development units 3*a* to 3*d*. The primary transfer bias is induced between the photoconductor drums 1*a* to 1*d* and the intermediate transfer belt 4. The print engine 11 reads a gradation correction table, and corrects density of each gradation level according to the table, and performs development of a toner image of the corrected density.

A non-volatile memory 12 is a memory device in which partial image data 31 is stored. The partial image data 31 is an instance of the toner pattern data. As the non-volatile memory 12, a ROM, a flush memory or the like is used. The partial image data 31 is threshold conversion data of a partial image. The partial image is a part of a base pattern image with a predetermined size and does not contain any sides of the base pattern image. The base pattern image is an image generated in a threshold conversion method that performs single or multiple threshold conversion by sequentially calculating a converted pixel value from original values of adjacent pixels. In this embodiment, the partial image data 31 is single-threshold conversion data of such partial image. In threshold conversion, a predetermined number of values has been set in advance, and an original value is converted to one of the values by using one or more thresholds.

Figure 3A:
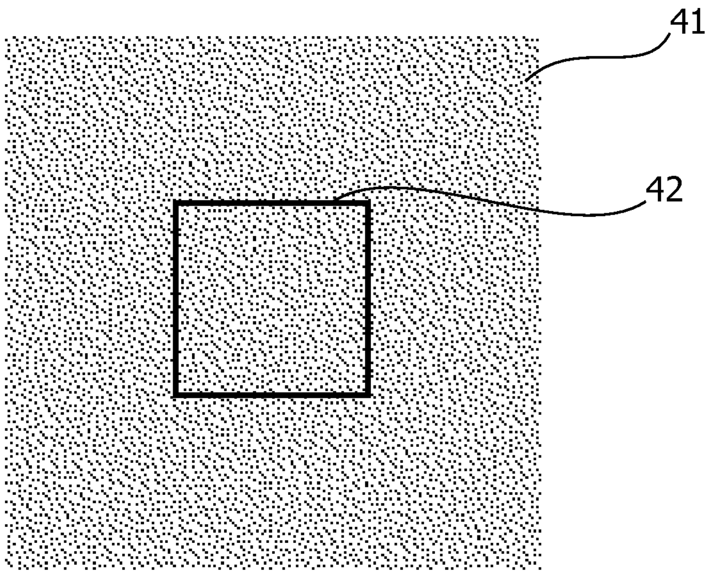
FIGS. 3A and 3B are diagrams that explain an instance of a toner pattern generated in Embodiment 1.
Figure 3B:
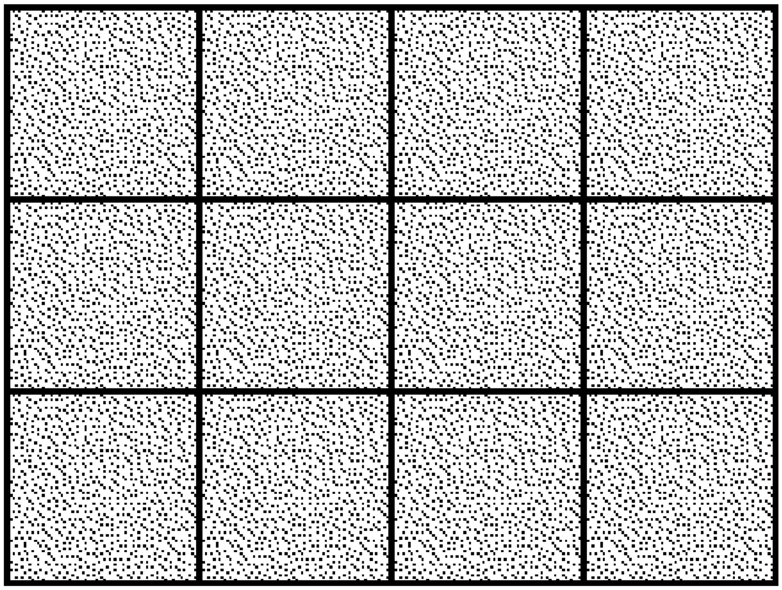

FIGS. 3A and 3B are diagrams that explain an instance of a toner pattern generated in Embodiment 1. FIG. 3A is a diagram that shows an instance of the partial image 42 of the base pattern image 41 generated by single-threshold conversion on a patch image of a predetermined density. A coverage rate of the base pattern image 41 is proportional to a density of the original patch image. FIG. 3B is a diagram that shows an instance of a toner pattern formed by arranging the partial image 42 repeatedly. Thus, the partial image data 31 contains image data of such partial images 42 generated for respective density levels in a gradation.

As shown in FIG. 3A, in this embodiment, the partial image 42 is a center part (N×N dots, M>N) in the base pattern image 41 of M×M dots. The number of dots M in a side of the base pattern image 41 is, for example, about 120 to 200. The number of dots N in a side of the partial image 42 is equal to or more than the square root of the number of gradation levels.

It should be noted that in Embodiment 1, this partial image is smaller than a beam spot formed on the intermediate transfer belt 4 by the detection light emitted from the sensor 8.

Thus, if the partial image has a rectangle shape (or a square shape), then the length of its diagonal line is shorter than the diameter of the spot (about 2 millimeter). Therefore, the number of dots that consist of the toner pattern tends not to vary due to a shift of the spot. Moreover, in this embodiment, the partial image has an area capable of depicting a predetermined number of gradation levels (e.g. 256 gradation levels). Therefore, the partial image has at least 256 pixels capable of depicting any of density levels corresponding to 256 gradation levels.

A patch image generator unit 21 of the print engine 11 controls the exposure device 2 and so on, and generates a toner pattern image such as shown in FIG. 3B (i.e. a patch image generated by single-threshold conversion), and performs toner development of the toner pattern image. The toner pattern image is generated by arranging the partial image 42 of the partial image data 31 repeatedly in the primary scan direction and the secondary scan direction. In this embodiment, a patch image on the intermediate transfer belt 4 has a rectangle shape (or square shape) with vertical and horizontal sides of about 1 centimeter.

Specifically, the patch image generator unit 21 stores the partial image data 31 in a RAM 22, reads parts of the partial image data 31 from the RAM 22 repeatedly for generating the toner pattern image, forms an electrostatic latent image of the toner pattern image on the photoconductor drums 1*a* to 1*d*, and performs toner development of the image. The RAM 22 is an instance of the memory device. For example, when depicting a line in the primary scan direction in the toner pattern image, the patch image generator unit 21 reads line data corresponding to the line in the partial image data 31 repeatedly. Therefore, the RAM 22 does not keep data of the whole toner pattern image at the same time.

Hereinafter is explained how the aforementioned image forming apparatus performs gradation adjustment.

Figure 4:
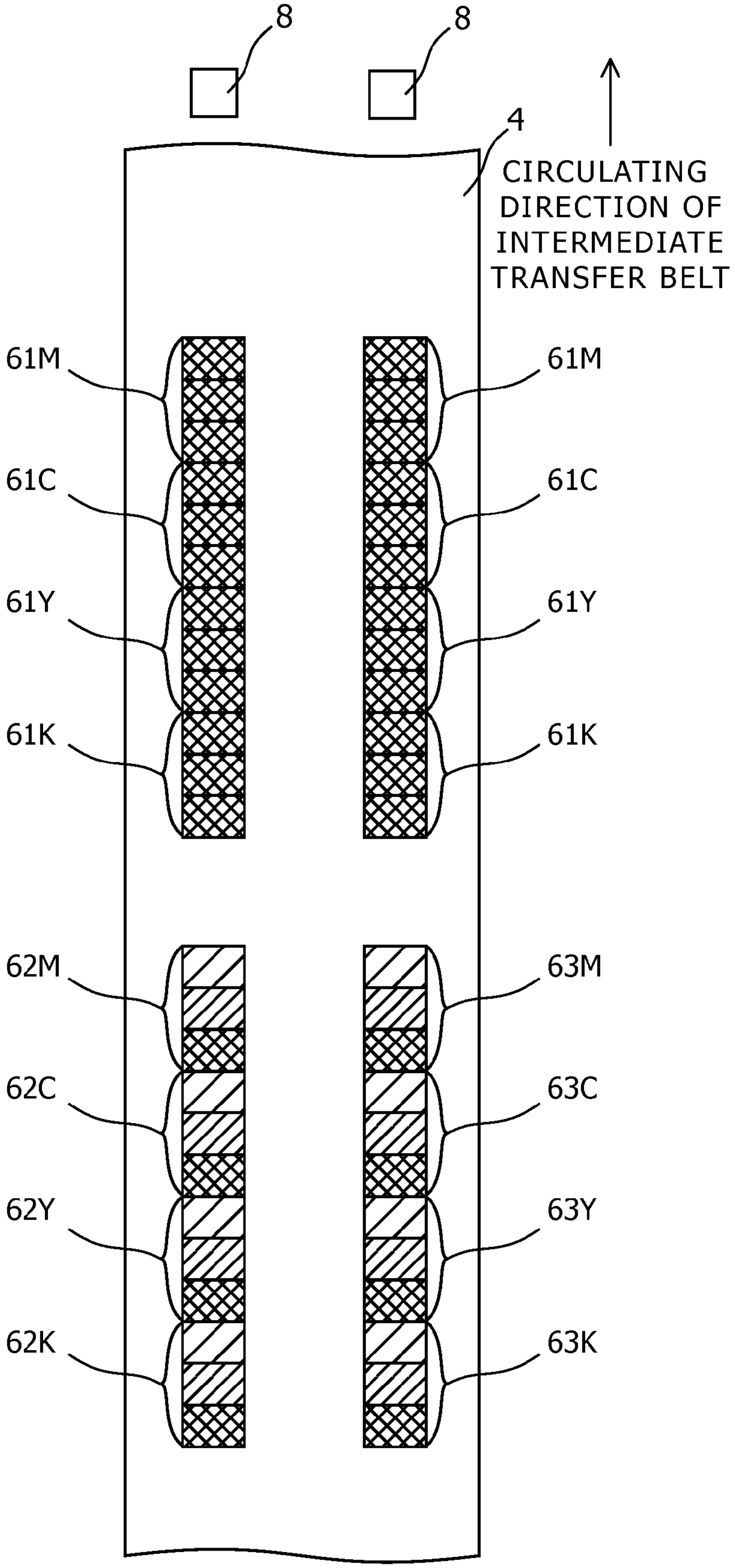
FIG. 4 is a diagram that shows an instance of patch images on an intermediate transfer belt in Embodiment 1.

FIG. 4 is a diagram that shows an instance of a toner pattern (patch images) on an intermediate transfer belt in Embodiment 1. There are two patch-image lines. The left one in the paper is a patch-image line for adjustment regarding an error diffusion method, and the right one in the paper is patch-image line for adjustment regarding a screen method.

Firstly, the print engine 11 starts rotation of the driving roller 5, the photoconductor drums 1*a* to 1*d*, and so on, and, in the first round of the intermediate transfer belt 4, from the sensor 8, obtains detection values (i.e. a detection value of reflection light intensity) of the positions on which patch images mentioned below are transferred in the surface of the intermediate transfer belt 4.

Secondly, density adjustment is performed before the second round of the intermediate transfer belt 4. The print engine 11 forms toner patterns 61M, 61C, 61Y and 61K of respective colors on the intermediate transfer belt 4 for adjustment of high density, and obtains detection values on the toner patterns 61M, 61C, 61Y and 61K from the sensor 8. Each of the toner patterns 61M, 61C, 61Y and 61K has a plural of patch images (in FIG. 4, three patch images). The print engine 11 forms these patch images (toner images) by changing the development bias under a fixed coverage rate. Then, the print engine 11 calculates respective density values of the patch images from the detection values of the patch images, and identifies a development bias value that provides most accurate density, and changes the development bias to the value.

Gradation adjustment is performed next. On the aforementioned measurement position in the surface of the intermediate transfer belt 4, the print engine 11 forms toner patterns 62M, 62C, 62Y, 62K, 63M, 63C, 63Y and 63K, and then obtains detection values of the toner patterns 62M, 62C, 62Y, 62K, 63M, 63C, 63Y and 63K from the sensor 8. The toner patterns 62M, 62C, 62Y and 62K are toner patterns for gradation adjustment regarding halftoning by an error diffusion method, and the toner patterns 63M, 63C, 63Y and 63K are toner patterns for gradation adjustment regarding halftoning by a screen method (a screen dither method).

Each of the toner patterns 62M, 62C, 62Y and 62K has a plural of patch images. Each of the patch images is formed, for instance, as shown in FIG. 3B as mentioned above, and therefore is an image generated by repeatedly arranging a partial image, which is generated by single-threshold conversion from a patch image of a predetermined density in a gradation. The print engine 11 reads a part of the partial image data 31 from the RAM 22 repeatedly and forms a part of the patch images on the photoconductor drums 1*a* to 1*d* in turn.

For example, the toner patterns 62M, 62C, 62Y, 62K, 63M, 63C, 63Y and 63K are formed on the intermediate transfer belt 4 that rotated 1.5 round from the beginning of the rotation. In this situation, if patch images for gradation adjustment regarding halftoning by an error diffusion method, then the patch images are generated in a short time. Therefore, the print engine 11 can generate patch images for gradation adjustment regarding halftoning by an error diffusion method, and patch images for gradation adjustment regarding halftoning by a screen method in parallel (i.e. at the same time).

The print engine 11 calculates respective density values of the patch images from the detection values of both the patch images and the belt surface (i.e. without the patch images) in the same positions, and updates respective gradation correction tables of the error diffusion method and the screen method according to the result of the calculation.

Consequently, according to Embodiment 1, the partial image data 31 for gradation adjustment is threshold conversion data of a partial image, the partial image is a part of a base pattern image and does not contain any sides of the base pattern image, and the base pattern image is an image generated in an error diffusion method; and the patch image generator unit 21 generates an image of a toner pattern by arranging the partial image 42 of the partial image data 31 repeatedly, and forms the toner pattern.

Therefore, data of such pattern image for gradation adjustment regarding an error diffusion method can be stored in a small memory area in a ROM or a RAM. In other words, in general, since a pattern image generated by an error diffusion method is irregular (i.e. dots are irregularly placed in the pattern image), data of the whole patch image are required for forming a toner patch image. However, in this embodiment, since only data of the partial image are kept in a memory, only a small memory capacity is required.

Figure 5:
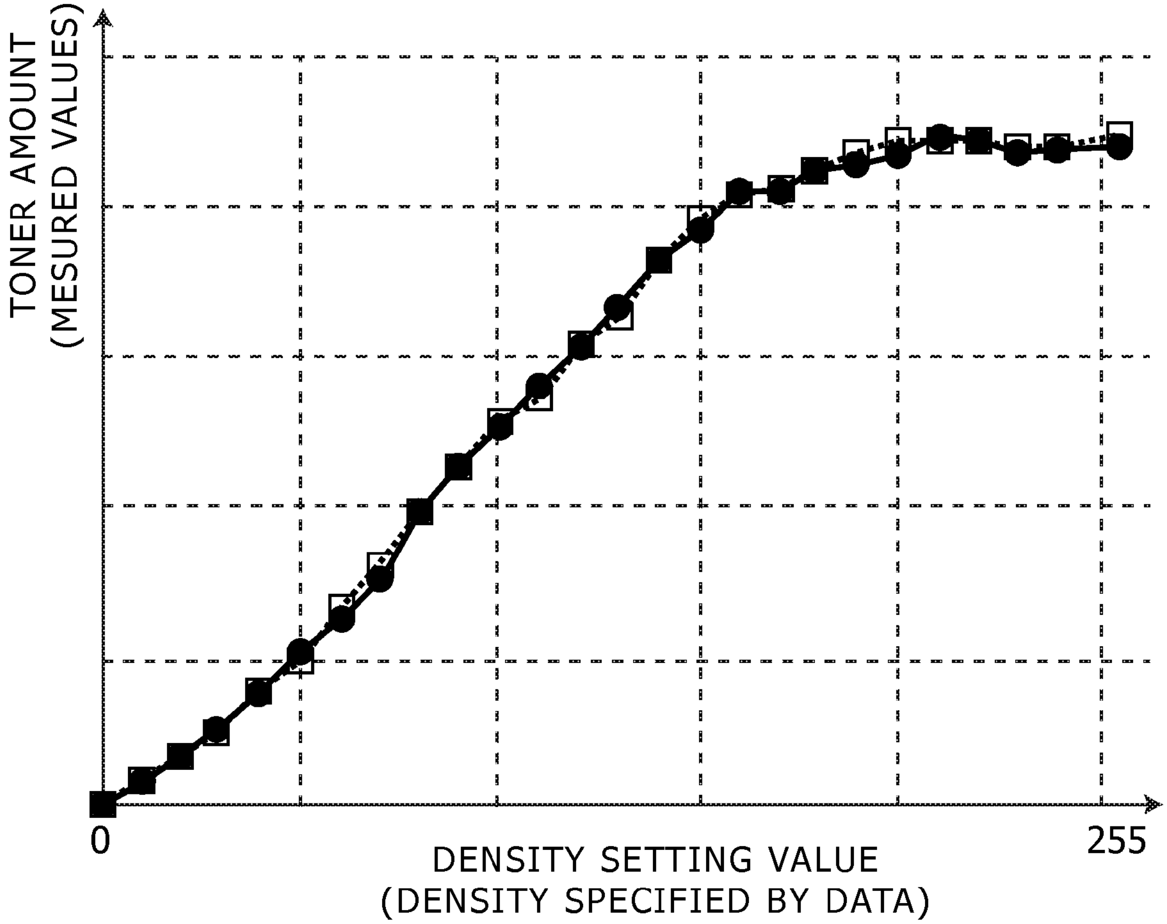
FIG. 5 is a diagram that shows an instance of a gradation characteristic of patch images for an error diffusion method in Embodiment 1.

FIG. 5 is a diagram that shows an instance of a gradation characteristic of patch images for an error diffusion method in Embodiment 1. In FIG. 5, black round dots and a solid line indicate a gradation characteristic of patch images according to this embodiment for an error diffusion method, and rectangle dots and a broken line indicate a gradation characteristic of patch images generated by single-threshold conversion of the whole patch image using an error diffusion method. As indicated in FIG. 5, since the difference between both is small, gradation adjustment of an error diffusion method with patch images generated according to this embodiment can be put to practical use.

Embodiment 2

In Embodiment 2 of this invention, the partial image is chosen from a plural of candidate partial images. Other parts of configuration of the image forming apparatus in Embodiment 2 is identical to that in Embodiment 1, and therefore, it is not explained here. In Embodiment 2, the partial image data 31 contains image data that shows the partial image chosen as mentioned blow.

Figure 6:
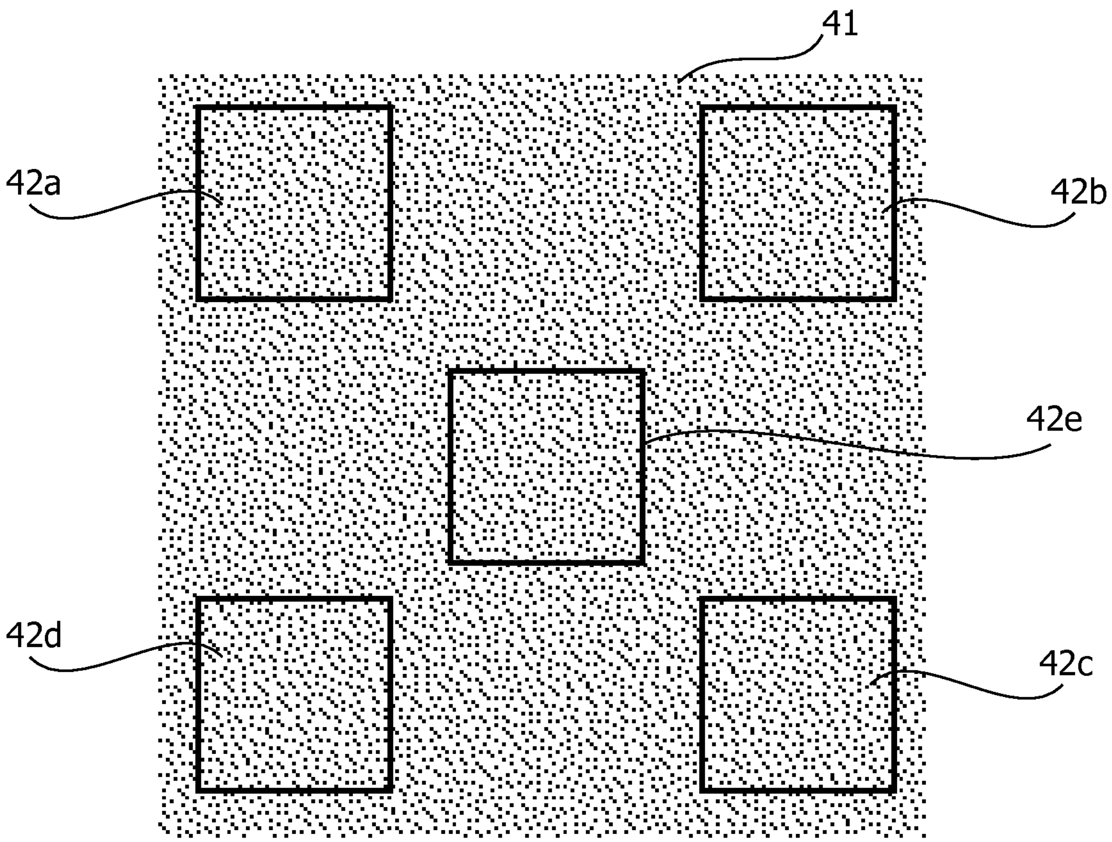
FIG. 6 is a diagram that shows an instance of candidate partial images in a base pattern image for a partial image in Embodiment 2.

FIG. 6 is a diagram that shows an instance of candidate partial images in a base pattern image for a partial image in Embodiment 2. In FIG. 6, five candidate partial images 42*a*, 42*b*, 42*c*, 42*d* and 42*e* are extracted from the base pattern image 41. The number of the candidate partial images, positions and shapes of the candidate partial image have been defined in advance. Here, the number of the candidate partial images is five, but may be any number more than 1; and the candidate partial images 42*a*, 42*b*, 42*c*, 42*d* and 42*e* have a same shape.

Referring to an image characteristic of an image generated by arranging the candidate partial image 42*i* (i=a, b, c, d, e) repeatedly so as to have the same size as the base pattern image 41, the candidate partial image 42*i* of which the generated image has the image characteristic closest to the image characteristic of the base pattern image 41 is chosen as the partial image 42. The partial image data 31 contains image data of the partial image 42 chosen in this manner. The candidate partial images 42*a*, 42*b*, 42*c*, 42*d* and 42*e* are generated from a base pattern image 41 corresponding to each of density levels in a gradation, and consequently, the partial image 42 is also obtained corresponding to each of density levels in a gradation.

There are two methods to choose the partial image 42 as follows.

In the first method, referring to the number of dots in an image generated by arranging the candidate partial image 42*i* (i=a, b, c, d, e) repeatedly so as to have the same size as the base pattern image 41, the candidate partial image 42*i* of which the generated image has the number of dots closest to the number of dots in the base pattern image 41 is chosen as the partial image 42. In case of the candidate partial image 42*i* shown in FIG. 6, 4 times in the primary scan direction, and 4 times in the secondary scan direction, arranging the candidate partial image 42*i* repeatedly, then an image with the same size as the base pattern image 41 is obtained. The candidate partial image 42*i* is chosen so that 16 times (=4×4) of the number of dots in the candidate partial image 42*i* is closest to the number of dots in the base pattern image 41.

In the second method, referring to the number of dot-sized edges in an image generated by arranging the candidate partial image 42*i* (i=a, b, c, d, e) repeatedly so as to have the same size as the base pattern image 41, the candidate partial image 42*i* of which the generated image has the number of dots closest to the number of dot-sized edges in the base pattern image 41 is chosen as the partial image 42.

Figure 7A:
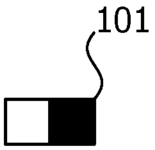
FIGS. 7A to 7C are diagrams that explain dot-sized edges counted to choose a partial image in Embodiment 2.
Figure 7B:
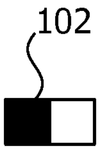
Figure 7C:

Here, the dot-sized edge is explained. FIGS. 7A to 7C are diagrams that explain dot-sized edges counted to choose a partial image in Embodiment 2. In Embodiment 2, dot-sized edges are counted in the primary scan direction. Along the primary scan direction as shown in FIGS. 7A and 7B, the place where a change occurs from a pixel without a dot to a pixel with a dot 101 is counted as an edge, and the place where a change occurs from a pixel with a dot 102 to a pixel without a dot is counted as an edge. Thus, the number of dot-sized edges in a pixel line shown in FIG. 7C is seven.

In Embodiment 2, dot-sized edges are counted in the primary scan direction, but dot-sized edges may be counted in the secondary scan direction. Alternatively, dot-sized edges may be counted in both the primary scan direction and the secondary scan direction.

Consequently, according to Embodiment 2, from candidate partial images extracted from the base pattern image 41, the best one is chosen as the partial image of which the partial image data 31 are used for gradation adjustment. Moreover, a density characteristic of a patch image is further close to a density characteristic of a toner pattern formed from whole area image generated by an error diffusion method.

The description of the present invention has been presented for purposes of illustration and description, and is not intended to be exhaustive or limited to the invention in the form disclosed. Many modifications and variations will be apparent to those of ordinary skill in the art.

For example, in the aforementioned embodiments, the partial image data 31 has been stored in the non-volatile memory 12 in advance. Alternatively, the patch image generator unit 21 may generate the partial image data 31 by calculation, and keep the partial image data 31 in the RAM 22. Therefore, a small area in RAM is adequate to keep pattern image data when generating a toner pattern.

Further, in the aforementioned embodiments, this invention is applied to gradation adjustment of halftoning by an error diffusion method. In addition, this invention can be applied to gradation adjustment of halftoning by another threshold conversion method that performs single or multiple threshold conversion by sequentially calculating a converted pixel value from original values of adjacent pixels.

Furthermore, in the aforementioned embodiments, the gradation correction tables are updated according to the measured density. Alternatively, exposure intensity of the exposure device 2 may be adjusted according to the measured density.

What is claimed is:

1. An image forming apparatus forming an image by using an electronic photography process, comprising:
- an image carrier capable of holding a toner pattern;
- a memory device in which toner pattern data is stored;
- a sensor that puts detection light onto the image carrier and detects reflection light from the image carrier; and
- a control unit that forms the toner pattern based on the toner pattern data and identifies a toner density of the toner pattern from output of the sensor;
- wherein the toner pattern data is threshold conversion data of a partial image, the partial image is a part of a base pattern image with a predetermined size and does not contain any sides of the base pattern image, and the base pattern image is an image generated in a threshold conversion method that performs single or multiple threshold conversion by sequentially calculating a converted pixel value from original values of adjacent pixels; and the control unit generates an image of the toner pattern by arranging the partial image of the toner pattern data repeatedly.

2. The image forming apparatus according to claim 1, wherein:
- the toner pattern data is threshold conversion data of a partial image, the partial image is a part of a base pattern image with a predetermined size and does not contain any sides of the base pattern image, and the base pattern image is an image generated by an error diffusion method.

3. The image forming apparatus according to claim 2, further comprising a RAM;
- wherein the control unit stores the toner pattern data in the RAM, reads the toner pattern data from the RAM repeatedly to generate the image of the toner pattern.

4. The image forming apparatus according to claim 2, wherein:

the partial image is smaller than a beam spot formed by the detection light on the image carrier.

5. The image forming apparatus according to claim 2, wherein:

the partial image has pixels of which the number is sufficient to depict a predetermined number of gradation levels.

6. The image forming apparatus according to claim 2, wherein:

the toner pattern data is single-threshold conversion data.

7. The image forming apparatus according to claim 2, wherein:

a photoconductor; and a developing device that develops the toner pattern on the photoconductor;

wherein the image carrier is an intermediate transferer on which the toner pattern is transferred from the photoconductor, and the control unit controls the developing device to develop the toner pattern on the photoconductor.

8. The image forming apparatus according to claim 1, wherein:

the partial image is an image chosen from candidate partial images in the base pattern image so that an image characteristic of an image generated by arranging the chosen image repeatedly to be with the predetermined size is closest to an image characteristic of the base pattern image.

9. The image forming apparatus according to claim 8, wherein:

the partial image is an image chosen from candidate partial images in the base pattern image so that the number of dots in an image generated by arranging the chosen image repeatedly to be with the predetermined size is closest to the number of dots in the base pattern image.

10. The image forming apparatus according to claim 8, wherein:

the partial image is an image chosen from candidate partial images in the base pattern image so that the number of dot-sized edges in an image generated by arranging the chosen image repeatedly to be with the predetermined size is closest to the number of dot-sized edges in the base pattern image.

11. The image forming apparatus according to claim 8, further comprising a RAM;

wherein the control unit stores the toner pattern data in the RAM, reads the toner pattern data from the RAM repeatedly to generate the image of the toner pattern.

12. The image forming apparatus according to claim 8, wherein:

the partial image is smaller than a beam spot formed by the detection light on the image carrier.

13. The image forming apparatus according to claim 8, wherein:

the partial image has pixels of which the number is sufficient to depict a predetermined number of gradation levels.

14. The image forming apparatus according to claim 8, wherein:

the toner pattern data is single-threshold conversion data.

15. The image forming apparatus according to claim 8, wherein:

a photoconductor; and a developing device that develops the toner pattern on the photoconductor;

wherein the image carrier is an intermediate transferer on which the toner pattern is transferred from the photoconductor, and the control unit controls the developing device to develop the toner pattern on the photoconductor.

16. The image forming apparatus according to claim 1, further comprising a RAM;

wherein the control unit stores the toner pattern data in the RAM, reads the toner pattern data from the RAM repeatedly to generate the image of the toner pattern.

17. The image forming apparatus according to claim 1, wherein:

the partial image is smaller than a beam spot formed by the detection light on the image carrier.

18. The image forming apparatus according to claim 1, wherein:

the partial image has pixels of which the number is sufficient to depict a predetermined number of gradation levels.

19. The image forming apparatus according to claim 1, wherein:

the toner pattern data is single-threshold conversion data.

20. The image forming apparatus according to claim 1, further comprising:

a photoconductor; and a developing device that develops the toner pattern on the photoconductor;

wherein the image carrier is an intermediate transferer on which the toner pattern is transferred from the photoconductor, and the control unit controls the developing device to develop the toner pattern on the photoconductor.

* * * * *